United States Patent
Kharidehal et al.

(10) Patent No.: US 12,445,429 B2
(45) Date of Patent: *Oct. 14, 2025

(54) SYSTEM AND METHOD FOR AUTHENTICATION AS A SERVICE

(71) Applicant: ServiceNow, Inc., Santa Clara, CA (US)

(72) Inventors: Chandra Mouli Kharidehal, Hyderabad (IN); Sumit Rathi, Hyderabad (IN); Gagan deep, Hyderabad (IN); Santosh Kumar Das, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 1023 days.

This patent is subject to a terminal disclaimer.

(21) Appl. No.: 17/452,506

(22) Filed: Oct. 27, 2021

(65) Prior Publication Data
US 2022/0046002 A1    Feb. 10, 2022

Related U.S. Application Data

(63) Continuation of application No. 16/249,715, filed on Jan. 16, 2019, now Pat. No. 11,218,467.

(51) Int. Cl.
| | |
|---|---|
| *H04L 9/40* | (2022.01) |
| *G06F 21/45* | (2013.01) |
| *G06F 21/60* | (2013.01) |
| *H04L 29/06* | (2006.01) |

(52) U.S. Cl.
CPC ............ *H04L 63/083* (2013.01); *G06F 21/45* (2013.01); *G06F 21/604* (2013.01); *H04L 63/061* (2013.01); *H04L 63/0876* (2013.01); *H04L 2463/082* (2013.01)

(58) Field of Classification Search
CPC . H04L 63/083; H04L 63/061; H04L 63/0876; H04L 63/08; H04L 63/0853; H04L 63/0884; H04L 63/0892; H04L 2463/082; G06F 21/30; G06F 21/31; G06F 21/34; G06F 21/45; G06F 21/604
See application file for complete search history.

(56) References Cited

U.S. PATENT DOCUMENTS

| | | |
|---|---|---|
| 6,609,122 B1 | 8/2003 | Ensor |
| 7,020,706 B2 | 3/2006 | Cates |
| 7,028,301 B2 | 4/2006 | Ding |
| (Continued) | | |

*Primary Examiner* — Edward Zee
(74) *Attorney, Agent, or Firm* — FLETCHER YODER PC

(57) ABSTRACT

A computing system includes a server. The server is communicatively coupled to a data repository and is configured to store a data in the data repository. The server is further configured to receive a first authentication information, the first authentication information comprising a login and a password for an entity, and to receive a second authentication information, the second authentication information comprising at least one identifying information generated by a hardware authentication device. The server is further configured to execute a hardware-based authentication as a service process, the authentication as a service process configured to use the first and the second authentication information as input to authenticate the entity, and to provide computing resources to the entity if the entity is successfully authenticated.

20 Claims, 9 Drawing Sheets

(56) References Cited

U.S. PATENT DOCUMENTS

| | | |
|---|---|---|
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 2013/0179208 A1* | 7/2013 | Chung .................. G06Q 10/06 705/7.15 |
| 2016/0124742 A1 | 5/2016 | Rangasamy et al. |
| 2018/0097640 A1* | 4/2018 | Queralt ............... H04L 63/0815 |
| 2019/0036924 A1 | 1/2019 | Wang et al. |
| 2019/0075102 A1* | 3/2019 | Kim ..................... H04L 9/3247 |

* cited by examiner

SYSTEM AND METHOD FOR AUTHENTICATION AS A SERVICE

CROSS-REFERENCE TO RELATED APPLICATION

This application is a continuation of U.S. patent application Ser. No. 16/249,715, filed Jan. 19, 2019, and entitled, "SYSTEM AND METHOD FOR AUTHENTICATION AS A SERVICE," which is incorporated by reference herein in its entirety for all purposes.

BACKGROUND

The present disclosure relates generally to system authentication and, more particularly, to hardware-based authentication as a service.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Within the context of cloud computing solutions for data repositories, users may be asked to deal with ever increasing amounts of data, e.g., including certain date-based information stored in the data repositories. In fact, the amount of cloud-based and date-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of date-based data to properly and efficiently perform their job functions. In certain embodiments, cloned data repositories may be created. With this in mind, the following embodiments are directed to improving the manner in which authentication of users for certain data repositories may be improved, including cloned data repositories.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below. Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. Further, multiple users may be authenticated to interact with a variety of computing resources, including cloned servers. The current embodiments enable systems and methods that may authenticate certain users via multifactor (e.g., two factor) authentication provided as a service. The authentication systems and methods may include the use of hardware devices, such as universal serial bus (USB) security devices among others, to provide for a second level of security during the initial user creation and/or during subsequent authentication processes.

The authentication processes may further include authentication into systems such as hub and spokes, and that create and execute certain information flows. The information flows may include "sub-flows", "Actions", and "Steps", as further described below. The techniques described herein may provide for both server side as well as client side authentication mechanisms suitable for improving security of the overall computing environment. In some embodiments, authentication may be provided to comply with certain standards, such as the Fast Identity Online (FIDO™) Alliance standards available via a web address of fidoalliance.org, out of Mountain View, California, United States. By providing for more efficient and secure authentication mechanism, the techniques described herein may enable an improved and more secure computing system that provides multifactor authentication (e.g., hardware-based authentication) as a service.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
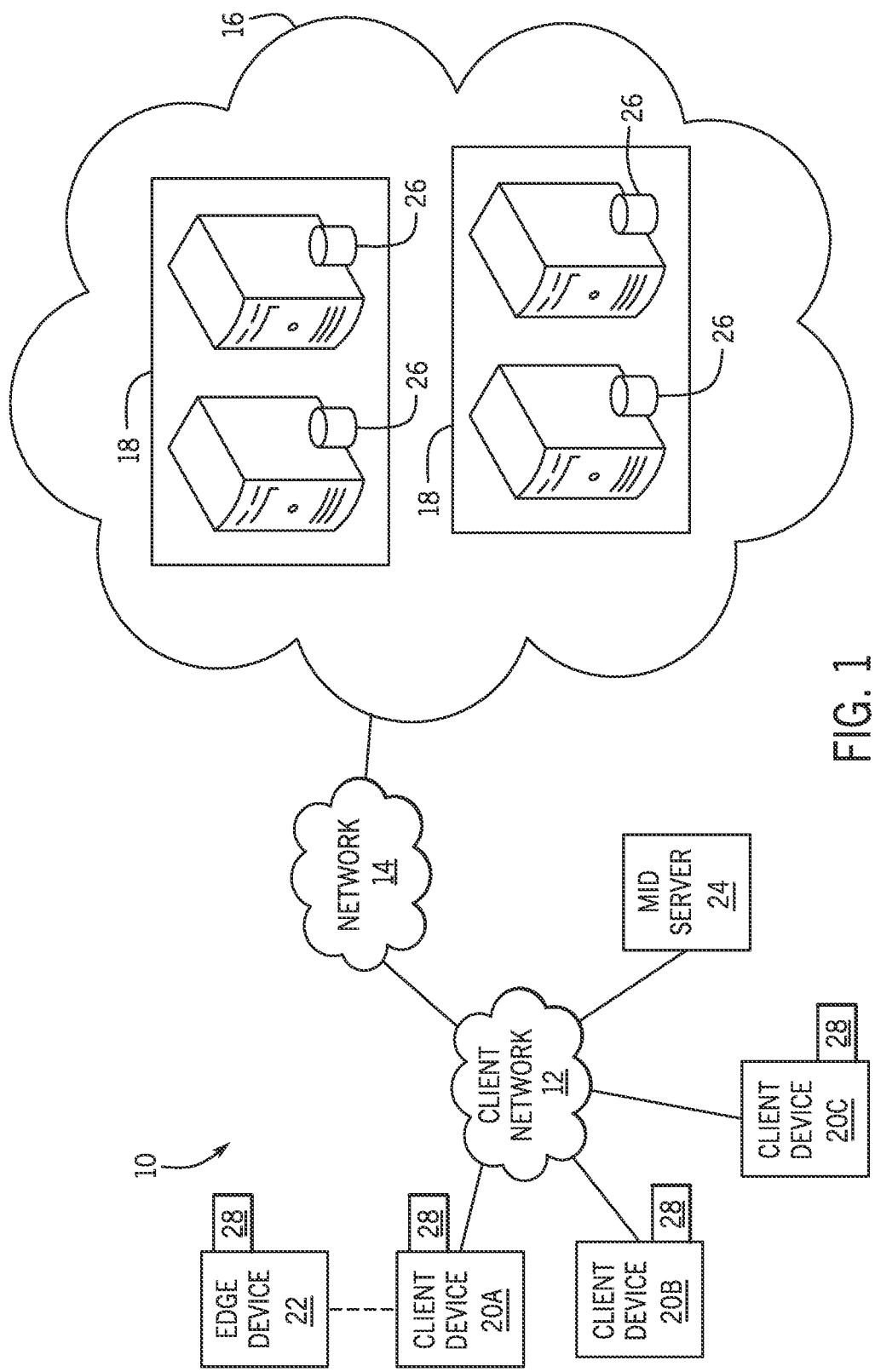
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "two factor authentication" may refer to authenticating an entity (e.g., user or other entity including a software entity) via at least two separate authentication processes. The two factor authentication may include 1) known information (e.g., login/password) and 2) something the entity possesses (e.g., hardware security device) or some property of the entity (e.g., biometric property such as retinal scan). As user herein, the term "universal 2nd factor (U2F) authentication" may refer to an open authentication standard that provides for two factor authentication by using specialized hardware devices such as universal serial bus (USB) or a near-field communication (NFC) hardware security device. The USB and/or the NFC security devices may be certified by certain organizations, such as the FIDO Alliance, as providing certain crypto secure processing and tamper proof techniques.

As used herein, the term "flow" may refer to data processing of information (e.g., database records) that may be presented to a user in a flow chart-like view. A flow may have inputs but may not have an output. A flow may include one or more "sub-flows" and/or one or more "Actions." The flow may also include "triggers" and control logic. A "sub-flow" as used herein may refer to data processing of information (e.g., database records) also presented to the user in a flow chart-like view. Unlike the flow, a sub-flow may have both inputs and outputs. A sub-flow may additionally contain Actions, triggers, control logic and/or other sub-flows. A "trigger" may be "fired" or turned on by a change in certain conditions, such as a change in one or more database records. The trigger may also be "fired" or otherwise turned on via a schedule, e.g., daily, weekly, monthly schedule. "Action" as used herein may include one or more "Steps." Steps may be self-contained code, such as scripts (e.g., Java, JavaScript code) provided by the manufacturer of the software tools used to create the flows, sub-flows, and the like. Steps may also be provided by users and any other entity. As used herein, the terms "flow objects" may refer to flows, sub-flows, Actions, and Steps.

Present embodiments are directed to providing for a universal 2nd factor (U2F) authentication framework that may be delivered as an authentication service. The U2F authentication framework described herein may enable the creation of a U2F authenticated user that may then log into various information repositories and/or systems via using 1) a login/password combination and 2) a U2F hardware security device. In certain embodiments, the techniques described herein may include processes useful in creating user login and/or privileges that may be immune to attacks, such as man-in-the-middle attacks, by using U2F techniques as a service. The embodiments described herein may additionally or alternatively include a process useful in authenticating, in real-time, various users to enable access to a variety of computing resources, including cloud-platform resources, such as may be embodied in a multi-instance or multi-tenant framework.

With the preceding in mind, the following figures relate to various types of generalized system architectures or configurations that may be employed to provide services to an organization accessing a cloud-platform, such as may be embodied in a multi-instance or multi-tenant framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

It would be beneficial to improve authentication of users of the client devices 20, 22 with the data centers 18 and the virtual servers 26. Accordingly, universal 2nd factor (U2F) devices 28 may be provided to be used in authentication processes. The U2F devices 28 may include universal serial bus (USB) or a near-field communication (NFC) hardware authentication devices. The U2F devices 28 may be certified by certain organizations, such as the FIDO Alliance out of Mountain View, California, United States, to provide for certain security processes. The U2F devices 28 may provide, for example, for cryptographic information exchange, and may store certain information, such as cryptographic public/private keys, in tamper-proof hardware. In use, the U2F devices 28 may provide for hardware-based authentication during two factor (or multi-factor) authentication processes, as further described below. An example of implementing a customer instance with U2F authentication within a multi-instance cloud architecture will be discussed in more detail below with reference to FIG. 2.

Figure 2:
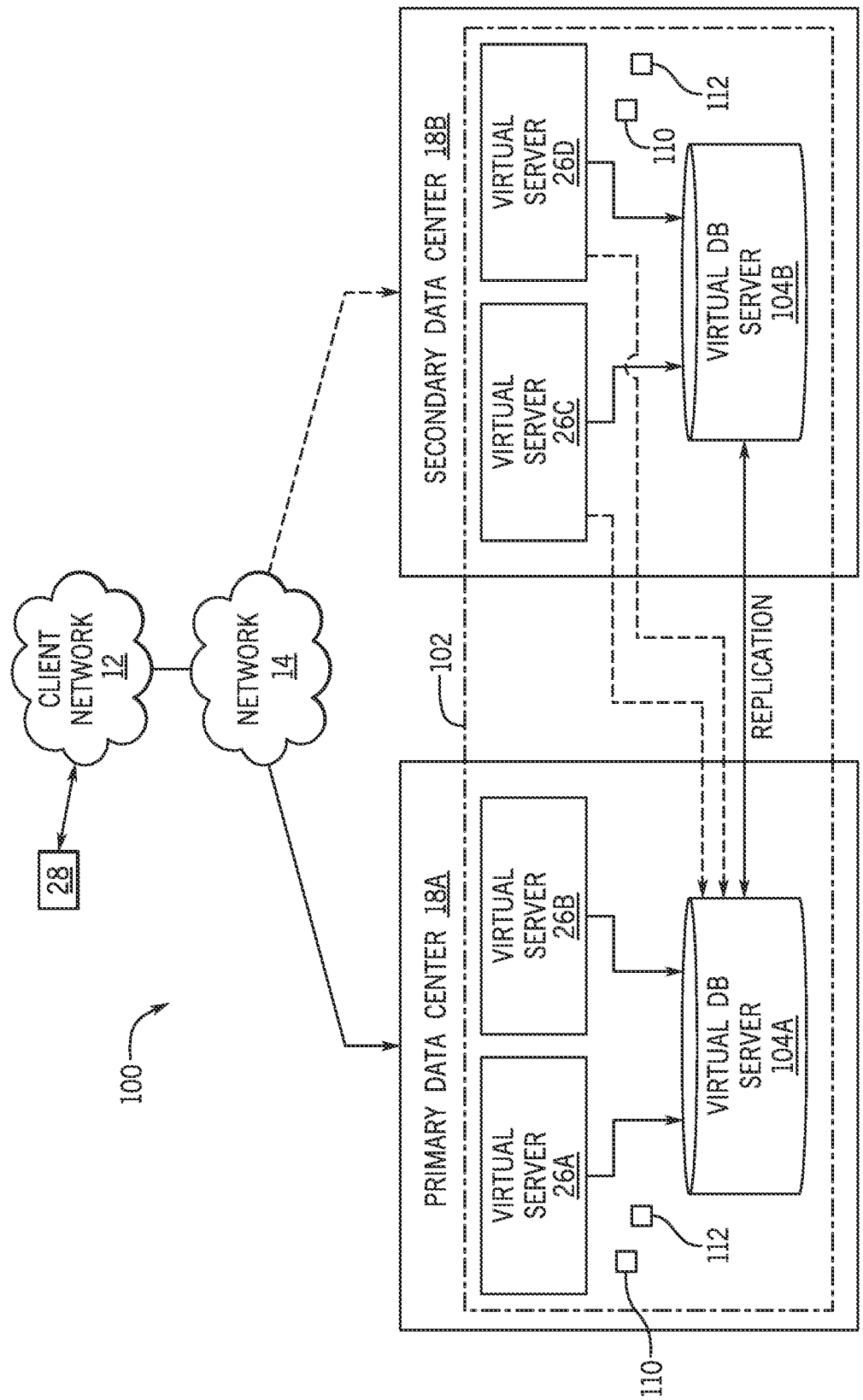
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, an authentication system 110 may provide for hardware-based authentication as a service. That is, the authentication system 110 may be executable by the virtual servers 26 and/or the virtual database servers 104 to enable a user of the client network to utilize, for example, the U2F device 28 as part of one or more authentication processes further described below. Once authenticated via the authentication system 110, various resources provided by the virtual servers 26 and/or the virtual database servers 104 may be used. For example, the virtual servers 26 and/or the virtual database servers 104 may include or be operatively coupled to a Flow Designer system 112. Automation processes created by the Flow Designer system 112 as further described below may be created and/or used by the user authenticated via the authentication system 110. Further, software development activities, e.g., objects created via the Flow Designer system 112 may also be managed by the user authenticated via the authentication system 110.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
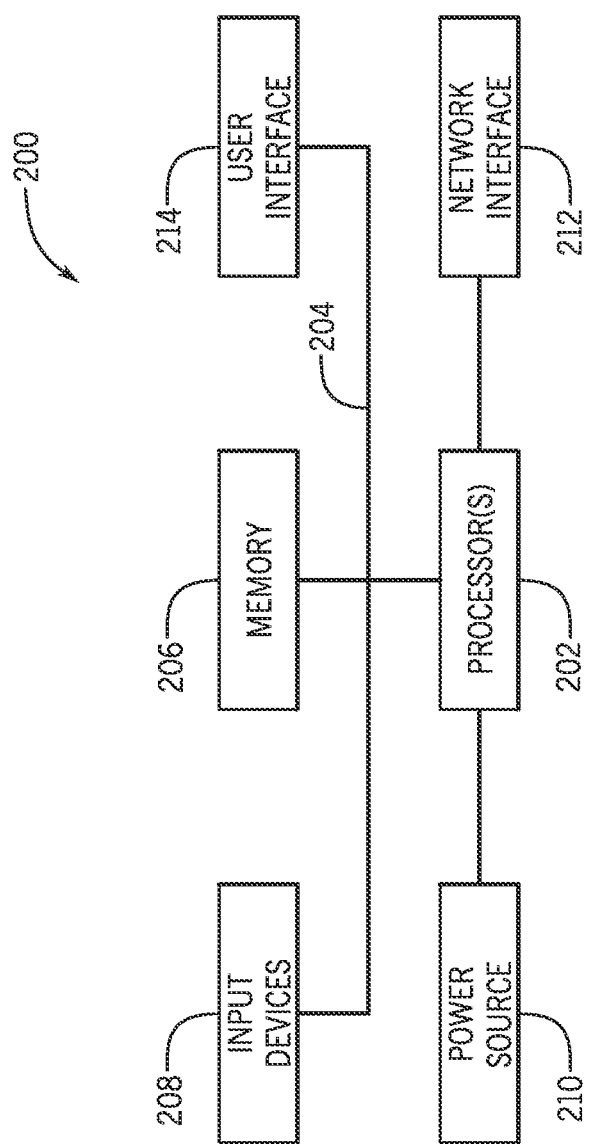
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
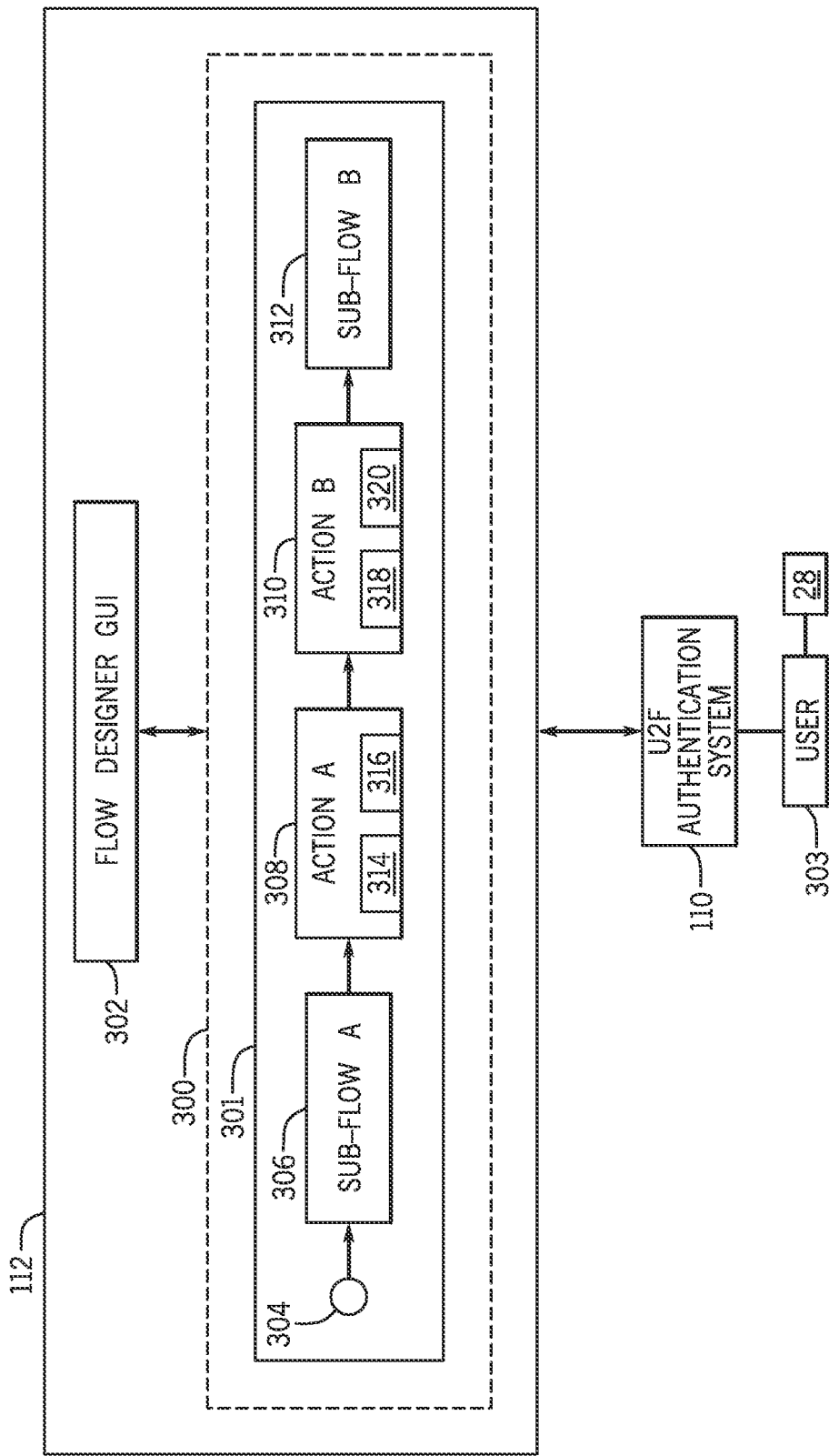
FIG. 4 is a block diagram illustrating a flow data processing system suitable for creating custom flow objects and for executing the flow objects via front-end and back-end flow application programming interfaces (APIs), in accordance with an embodiment.

It may be beneficial to describe certain computing resources that may be provided once the user has been authenticated via the multifactor authentication techniques described herein. Turning now to FIG. 4, the figure is a block diagram illustrating an embodiment of the Flow Designer system 112 suitable for enabling an authenticated user in creating information flow objects 300. In the depicted example, a user 303 may be authenticated into the Flow Designer system 112 via the authentication system 110. More specifically, the user may insert the U2F device 28 into a computing device (e.g., via a USB port) and the authentication system 110 may then use the U2F device 28 to authenticate the user, as further described with respect to the figures below.

Once the user 303 is authenticated, then the user may proceed to in interface with and use the Flow Designer system 112. It is to be understood that the Flow Designer system 112 as depicted is an example only and may be included in or implemented using one or more of the virtual servers 26, the virtual DB servers 104, or a combination thereof. In the depicted embodiment, the Flow Designer system 112 includes a flow designer GUI 302, e.g., a visual information flow creation tool. The flow designer GUI 302 may provide for visual programming via natural languages as opposed to entering text representative of a computer program. The flow designer GUI 302 may include executable code or computer instructions suitable for creating, managing, accessing, and/or editing the flow objects 300. In the depicted embodiment, a single flow 301 is shown in the flow objects 300. It is to be understood that more than one flow may be provided in the flow objects 300.

The flow 301 may include a trigger 304 which may be "fired" or otherwise turned on by certain changed condition, such as a change in one or more records stored in a database (e.g., stored in the virtual DB servers 104). The trigger 304 may additionally be "fired" periodically, for example, as part of a schedule (e.g., hourly schedule, daily schedule, weekly schedule, monthly schedule, and so on). The trigger 304 may thus be used to initiate execution of other flow objects 300, such as sub-flow 306, Action 308, Action 310, and sub-flow 312.

In the depicted embodiment, the trigger 304 initiates execution of the sub-flow 306. The sub-flow 306 may include Actions, control logic (e.g., Boolean logic, branching logic, termination logic), other sub-flows, and so on. The sub-flow 306 may additionally take in inputs and provide outputs. For example, output of the sub-flow 306 may be used as input to the Action 308. The Action 308 may use the inputs provided to execute Steps 314, 316. The Action 308 may also include control logic. Steps, such as the Steps 314, 316, and may be self-contained code, such as scripts (e.g., Java, JavaScript code) provided by the manufacturer of the flow designer system 112. As an example, the Flow Designer system 112 may be provided by ServiceNow™ Inc., of Santa Clara, California, U.S.A., under the name Flow Designer™. The Steps 314, 316 may be additionally or alternatively provided by other third parties and/or coded by certain users, such as IT users.

Steps may include any number of functionality, such as requesting approval from other users of the servers 26, 104, creating records in a database table, editing the record in the database table, deleting the records in the database table, creating server tasks, logging messages, looking up database information, notifying of certain events (e.g., incidents, change requests, problems, changes to user records), executing scripts, such as JavaScript, sending email, waiting for a condition to occur, and so on. Action 310 may execute following Action 308. In turn, Action 310 may include Steps 318, 320, and upon completion of Step 320, sub-flow 312 may be executed. Once sub-flow 312 finishes execution, the flow 301 finishes. Flows, such as the flow 301, may not have outputs. The flows may be executable from external clients, such as a clients coupled to the client network 12 shown in FIG. 1.

Figure 5:
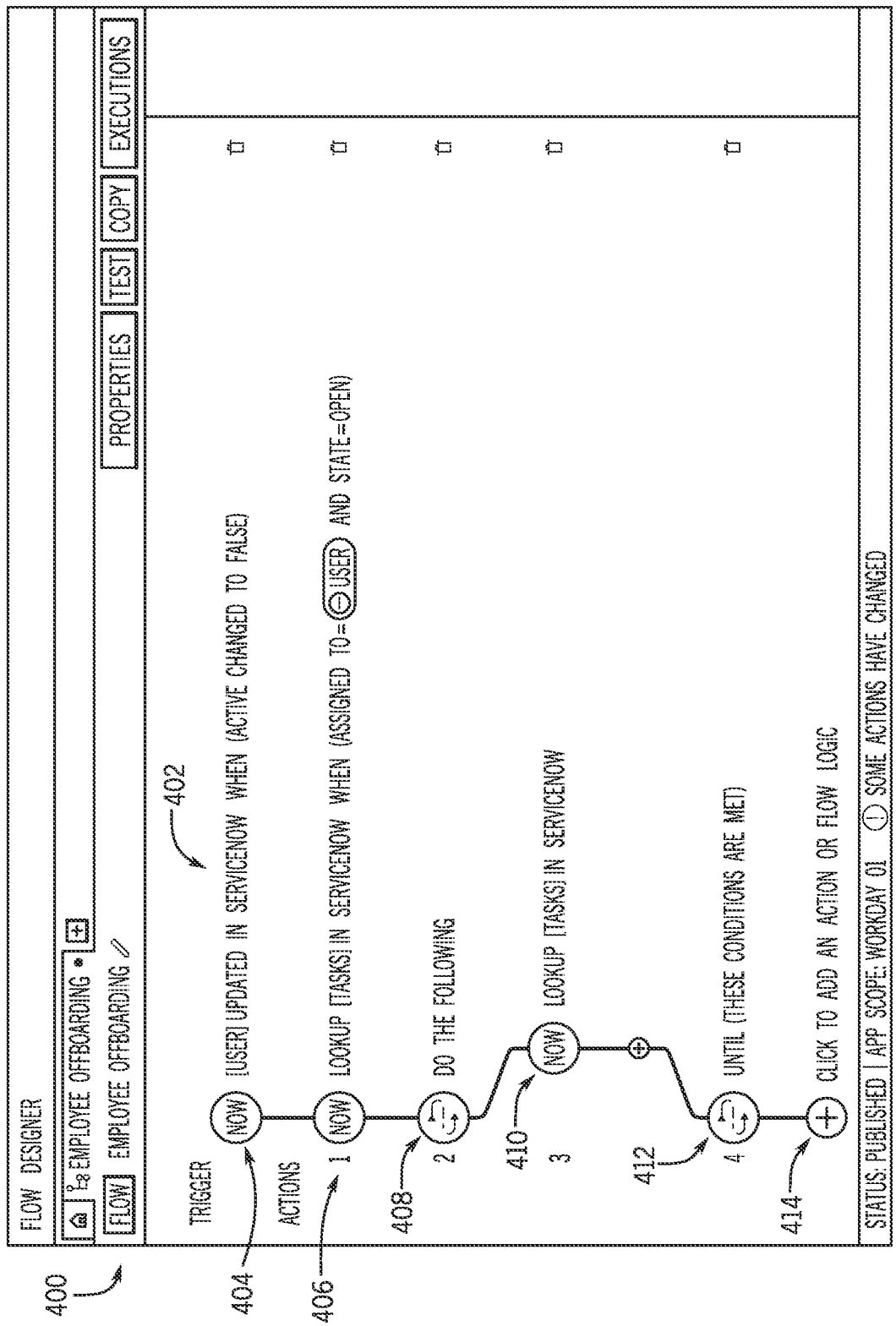
FIG. 5 is a screenshot of an embodiment of a graphical user interface (GUI) suitable for creating and/or editing flow objects, in accordance with an embodiment.

FIG. 5 is a screenshot depicting an embodiment of a graphical user interface (GUI) 400 suitable for inputting certain flow objects 300 into a flow, such as the flow 301. The GUI 400 may be accessible once the user 303 is authenticated via the authentication system 110 and used to create the flow 301 via the Flow Designer system 112. In the depicted embodiment, a graphical flow view 402 of a flow is shown. Indeed, the GUI 400 may be used to create and edit any number of graphical flow views that may then be executed as flow objects 300.

In the depicted embodiment, the graphical flow view 402 may start execution via a trigger 404. More specifically, if a certain user record is updated, then the trigger 404 may "fire" and execute Action 406. The Action 406 may then retrieve a set of tasks assigned to the updated user that have an open state. The retrieved tasks may then be further process via a "Do . . . Until" control logic. More specifically, a Do logic 408 may execute one or more Actions, such as Action 410, until the "Until" control logic 410 has its conditions met. More sub-flows and/or Actions may be added, for example, via the "+" control 414. As shown, natural language and visual composition via the flow designer 302 may be used to enable the creation of executable flow objects 300. The flow objects 300 may then be reused by clients connected to the network 12.

Figure 6:
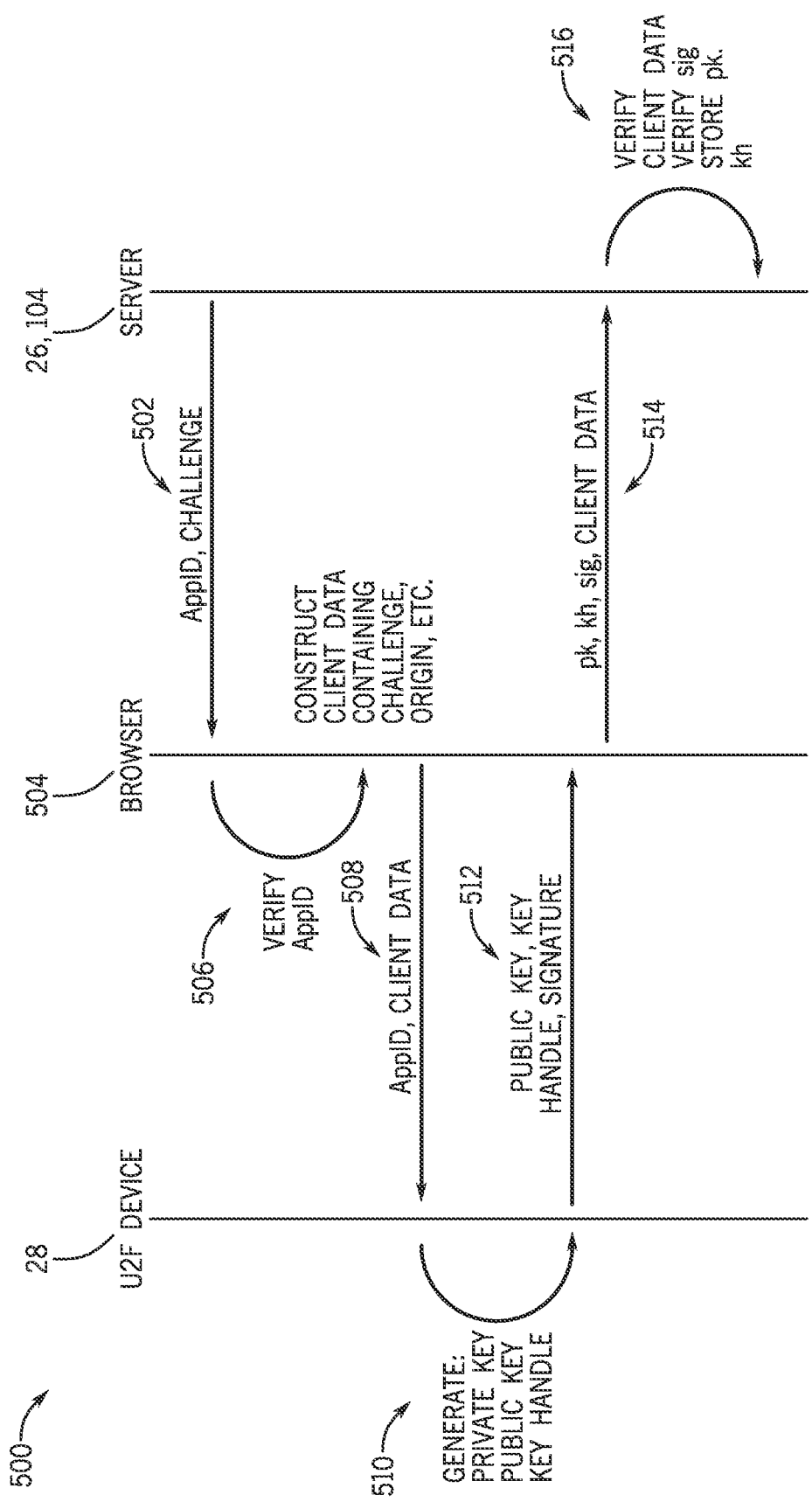
FIG. 6 is an interaction overview diagram illustrating an embodiment of a process suitable for registering a universal 2nd factor (U2F) hardware security device.

Turning now to FIG. 6, the figure is an interaction diagram illustrating an embodiment of a process 500 suitable for registering the U2F device 28 as an authentication device suitable for authenticating, for example, the user 303 as a verified user of the system 10. The process 500 may be implemented as computer code or instructions executable by the one or more processors 202 and stored in the memory 206. In the depicted embodiment, a server, such as the servers 26 and/or 104, may transmit, via a secure transport layer (e.g., transport layer security [TLS]), certain authentication information 502, such as an application ID (AppID), an origin (e.g., uniform resource identifier [URI]), and a challenge request. The AppID may include or be tied to a uniform resource locator (URL) of a target site (e.g., website) used by the server(s) 26, 104. The authentication information may be received by a browser 504, such as a web browser. The browser 504 may verify (activity 506) the authentication information 502 (e.g., AppID), for example by using a TLS handshake protocol to authenticate with the server and verify some or all of the information 502, such as the AppID.

Once the authentication information (e.g., information 502) is verified, the browser 504 may then transmit browser-verified information 508, for example, to the U2F device 28. The U2F device 28 may then generate (activity 510) a private key, a public key, and a key handle. In some embodiments, the U2F device 28 may generate (activity 510) a public/private key cryptographic pair to be origin-specific. That is, a separate public/private set of keys may be generated for each origin registered. The U2F device 28 may also derive (activity 510) the key handle to identify, for example, the generated private key. That is, the key handle may later be used by the U2F device 28 to identify a private key, as further described below.

The signature may be based on the client data, AppID, the public key, the handle, or a combination thereof. In some embodiments, the signature is a cryptographic function of AppID, client data, public key, and/or handle.

The public key, key handle, and signature may then be transmitted as information 512 to the browser 504. The browser 504 may then re-transmit (activity 514) the information 512 to the server(s) 26, 104. The server(s) 26, 104 may then verify and store (activity 516) the information 512, for example to be used during subsequent authentication activities after the initial registration process 500. Verification may include using the submitted signature and cryptographic techniques to test that the signature was created based on the client data, AppID, the public key, the handle, or a combination thereof.

Figure 7:
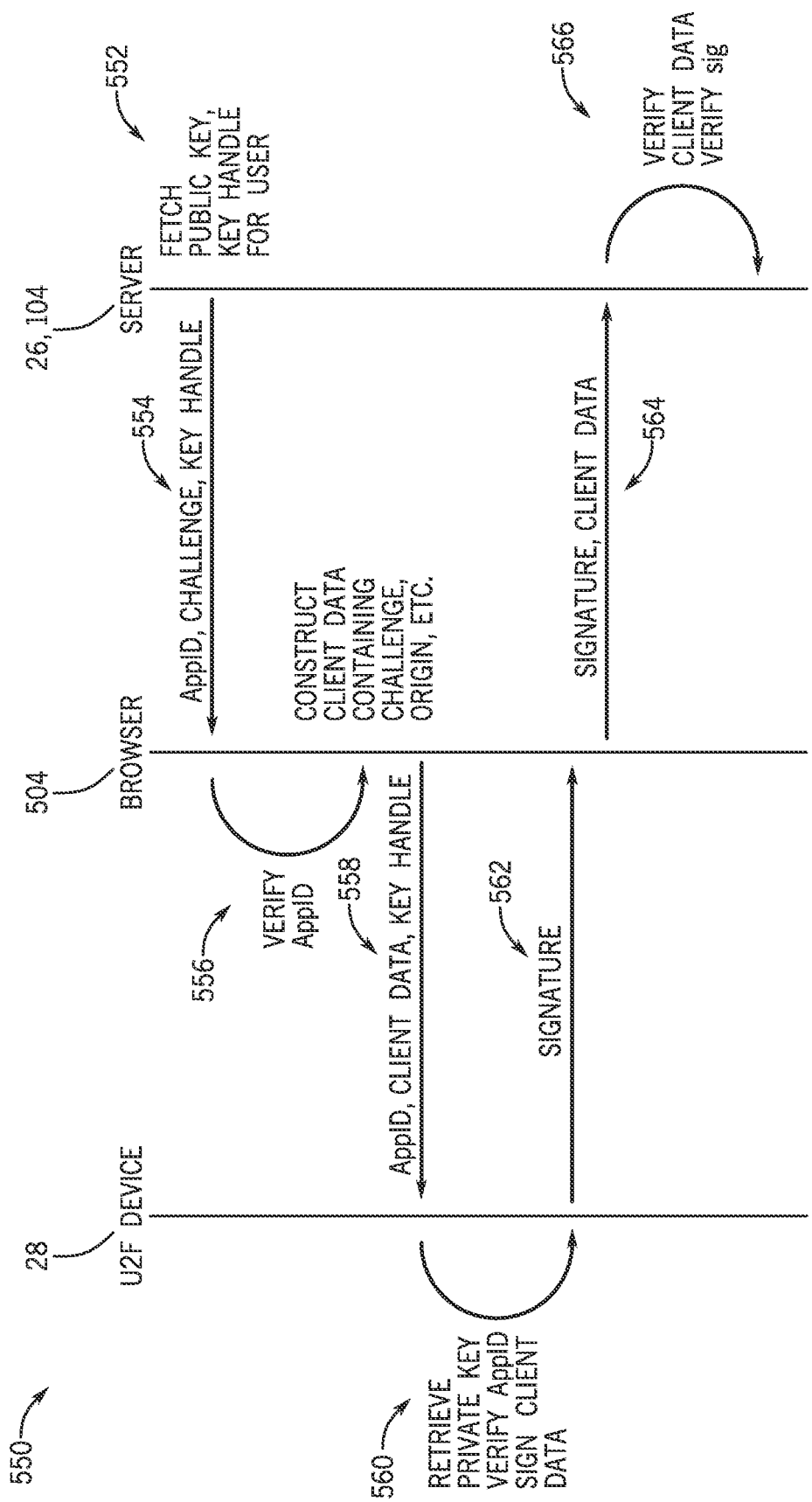
FIG. 7 is an interaction overview diagram illustrating an embodiment of a process suitable for authenticating an entity (e.g., user) once the U2F hardware security device has been registered.

FIG. 7 is an activity diagram illustrating an embodiment of a process 550 suitable for authenticating the user 303 with the U2F device 28 after successfully registering the U2F device 28 via the process 500. The process 550 may be implemented as computer code or instructions executable by the one or more processors 202 and stored in the memory 206. The user 303 may first enter a login and password information, and then insert the U2F device 28 in a USB port of a computing device. The server(s) 26, 104 may validate the user's login and password information and then fetch (activity 552) the public key and key handle associated with the U2F device 28. The server(s) 26, 104 may then transmit information 554 (e.g., authentication information), including an AppID, a challenge, and/or key handle. As described previously, the AppID may include a uniform resource locator (URL) of a target site used by the server(s) 26, 104.

The browser 504 may then verify (activity 556) the information 554 to authenticate the server(s) 26, 104. After verification (activity 556), the browser may transmit (activity 558), the information 554 to the U2F device 28. The U2F device 28 may then retrieve a private key, for example based on the key handle, and verify (activity 560) the information 554. For example, the U2F device 28 may use the key handle being communicated to look up a private key corresponding to the key handle, to then use the private key for further activities. The private key may be used, for example, to create certain authentication information 562. In one example, a signature component of the information 562 may be created with the private key by using encryption techniques. Information 562 may then be transmitted to the browser 504 from the U2F device 28. The browser 504 may then transmit the signature and other data (e.g., client data) as part of information 564, which may include some or all of the information 562. The server(s) 26, 104 may then verify (activity 566) the information 564, including the signature, the client data, and the like. For example, the signature may be compared to signatures stored for the previously transmitted key handle. Once verified, the server (s) 26, 104 may then fully authenticate (e.g., using two factors), the user 303 to then provide computing resources (e.g., access to tools such as shown in FIGS. 4 and 5). Accordingly, a more secure and efficient hardware-based authentication as a service may be provided.

Figure 8:
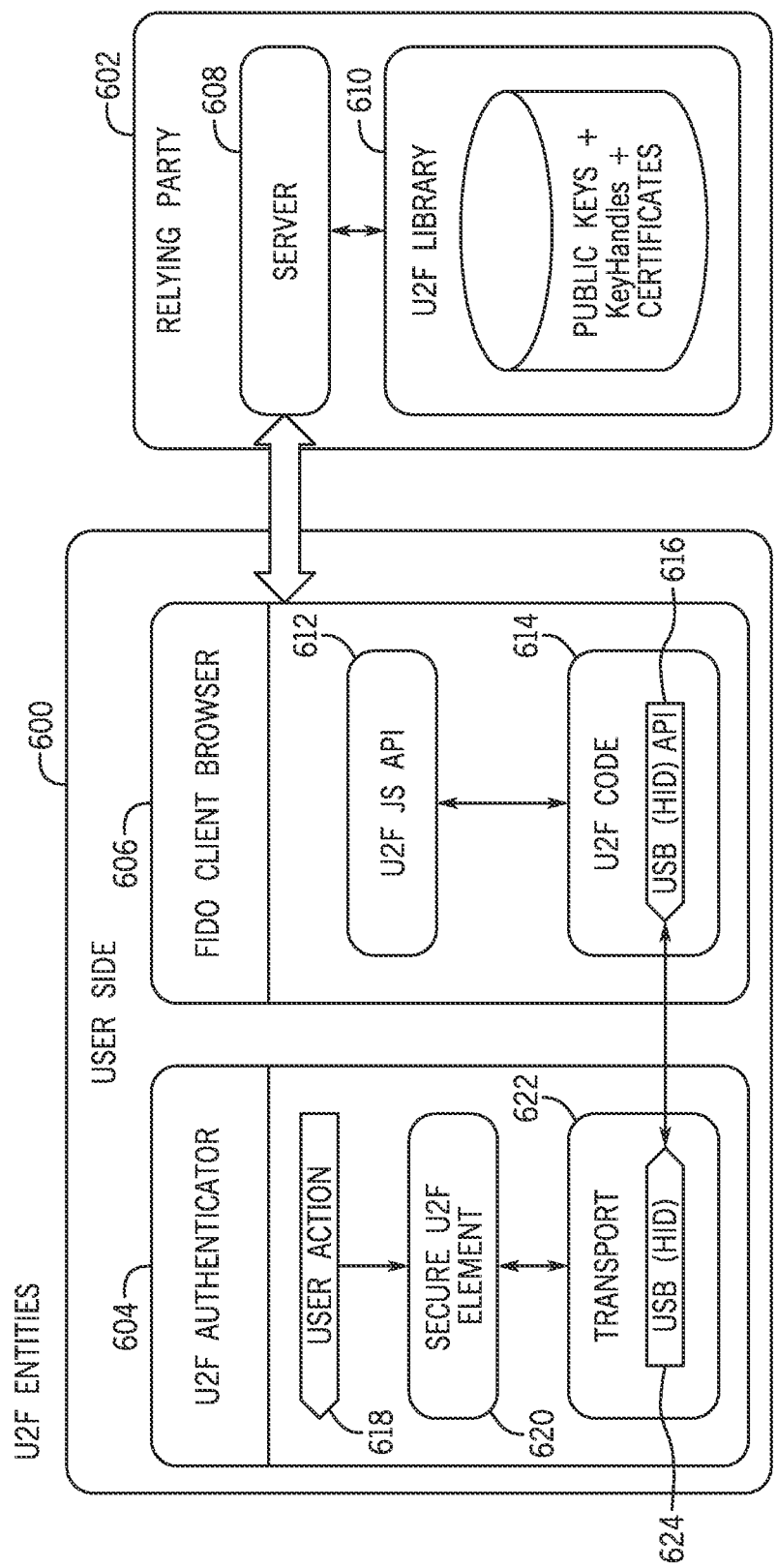
FIG. 8 is a block diagram depicting certain systems that may be used for multifactor (e.g., two factor) hardware-based authentication as a service.

FIG. 8 is a block diagram depicting certain systems (e.g., software systems, hardware systems) that may be used to implement the techniques described herein. For example, user side systems 600 may be employed by the user 303 while relying party systems 602 may be used by servers, e.g., servers 26 and/or 104, to provide for hardware-based authentication as a service. In the depicted embodiment, the user side systems 600 include U2F authenticator systems 604 and FIDO™ client browser systems 606. A server authentication system 608 may communicate with the FIDO™ client browser systems 606, for example, during the initial authentication process 500 and/or during subsequent authentication via the process 550.

The server authentication system 608 may include or be communicatively coupled to a U2F library system 610. In certain embodiments, the server authentication systems 608 may execute code in the U2F library system 610, for example, during the process 500 and 550. The U2F library system 610 may include cryptographic objects, functions, methods for authentication, objects, functions, methods for generation of challenges, for generation of AppIDs, for verifying client data, for verifying signatures, and so on. The U2F library system 610 may additionally be used to security store public keys, key handles, security certificates, and the like. Storage may be encrypted.

The FIDO™ client browser systems 606 may include U2F JavaScript (JS) application programing interfaces (API) 612 and U2F code systems 614. The U2F JS API 612 may provide for a set of objects, functions, methods, and the like, that provide for interfacing with the servers(s) 26, 104 and with the U2F device 28. For example, the U2F JS API 612 may enable the execution of U2F code 614. The U2F code 614 may include computer instructions suitable for implementing the browser 504 sections of the initial authentication process 500 and/or during subsequent authentication via the process 500. The U2F code 614 may also include a universal serial bus (USB) human interface device (HID) API and/or class used to interface with the U2F device 28 when the U2F device 28 is provided as a USB device.

The U2F authenticator systems 604 may include user action systems 618 suitable for interfacing with the user 303. For example, the user 303 may insert the U2F device 28 in a USB slot and the user action systems 618 may detect the insertion into the USB slot. The user action systems 618 may also detect other user actions such as button presses, commands via GUIs, and so on. A secure U2F element 620 may provide for tamper resistant storage of certain data, e.g., private/public keys, certificates, user authentication data, and so on. A transport system 622 may provide for a secure transport of information in and out of the U2F authenticator systems 604. The transport system may include a USB (HID) system 624 which may be used to interface with the USB (HID) system 616 of the U2F code 614 to transmit and receive information.

Figure 9:
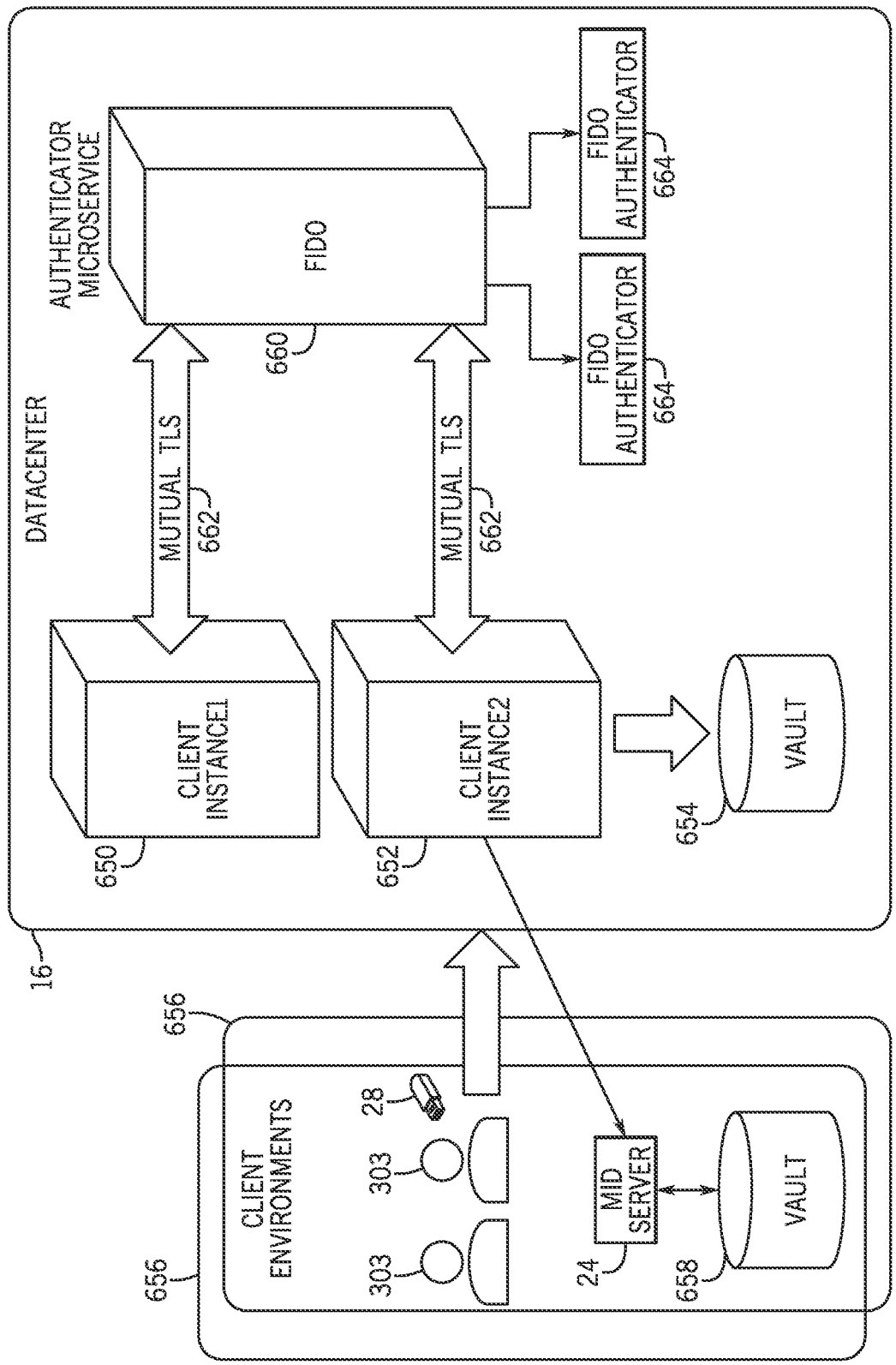
FIG. 9 is a block diagram of a system architecture that may be used to implement some or all of the techniques (e.g., authentication techniques) disclosed herein.

FIG. 9 is a block diagram of an embodiment of a system architecture that may be used to implement some or all of the techniques disclosed herein. In the depicted embodiment, the datacenter 18 is shown as including two client instances 650, 652 (e.g., equivalent to virtual server instances such as virtual servers 26). The client instances 650, 652 may be operatively coupled to a vault system 654 (e.g., equivalent to or included in the database servers 104).

Client environments 656 (e.g., communicatively coupled via the client network 12) may include one or more mid servers 24 operatively coupled to a vault system 658. The vault system 658 may store information similar to (or a copy of) the vault system 654 or portions of the vault system 654. During authentication activities (e.g., execution of the processes 500, 550), the users 303 may first login via a user login and password combination and then activate the U2F device 28 (e.g., insert the U2F device 28 into a USB port) for use as another (e.g., second) authentication factor.

In the depicted embodiment, the client instances 650, 652 may be communicatively coupled to an authenticator microservice system 660. For example, the authenticator microservice system 660 may be used to handle authentication requests incoming from the client environments 656. More specifically, the client instances 650, 652 may communicate (e.g., two-way mutual communication) with the authenticator microservice system 660 via transport layer security (TLS) 662. For example, when executing the processes 500 and/or 550, the authenticator microservice 660 may execute one or more authentication systems 664 to fulfill the authentication requests and/or responses.

The authenticator microservice system 660 may include a variant of service-oriented architectures (SOAs) and differs from a SOA by providing services that are more loosely coupled, fine-grained, and protocols which may be more lightweight when compared to SOA. Additionally, services in the authenticator microservice system 660 may be individually deployable.

In certain embodiments, the authenticator microservice 660 may include a container system, such as a Kubernetes system available from the Cloud Native Computing Foundation, that may automate certain container operations. For example, containers may be created that include libraries, dependencies, configuration files, and so on, that may be used to provide for a full container environment suitable for enabling execution of certain processes in or via the container. Accordingly, the containers may be developed in one (e.g., development) environment and be more easily moved to a second (e.g., production) environment because the container may include most or all of the files, dependencies, libraries, and so on, used in executing the processes in the container. Container operations, e.g., authenticator system 664 operations, may then execute in the container, and be managed, for example, by the microservice system 660. The microservice system 660 may provide for load balancing, API gateways, resilience, fault tolerance, autoscaling, self-healing, and so on. By providing for hardware-based authentication as a service, e.g., via microservices, the techniques described herein may enable a more efficient and improved authentication to a variety of server resources.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A server that includes at least one hardware processor configured to perform operations comprising:
   providing, to a client device communicatively coupled to the server, first authentication information comprising an Application ID (AppID), wherein the client device is communicatively coupled to a hardware authentication device;
   receiving, from the client device, second authentication information determined by the hardware authentication device based at least in part on the first authentication information, wherein the second authentication information comprises a public cryptographic key and a cryptographic key handle, wherein the cryptographic key handle references a private cryptographic key corresponding to the public cryptographic key of the hardware authentication device; and
   registering the hardware authentication device using the second authentication information as registration data for the hardware authentication device.

2. The server of claim 1, wherein the first authentication information comprises a challenge request generated using a universal second factor (U2F) library of the server.

3. The server of claim 1, wherein the AppID is associated with a uniform resource locator (URL) of a target website accessed by the server.

4. The server of claim 1, wherein, before receiving the second authentication information, the at least one hardware processor of the server is configured to perform operations comprising:
   receiving, from the client device, an authentication request via a transport security layer (TLS) handshake protocol to verify the first authentication information before the client device provides the first authentication information to the hardware authentication device to determine the second authentication information.

5. The server of claim 1, wherein the first authentication information comprises an origin uniform resource identifier (URI), and wherein the private cryptographic key and the public cryptographic key determined by the hardware authentication device are specific to the origin URI.

6. The server of claim 1, wherein the second authentication information comprises a client signature that is a cryptographic function of the AppID, the public cryptographic key, the cryptographic key handle, or any combination thereof.

7. The server of claim 6, wherein, before registering the hardware authentication device, the at least one hardware processor of the server is configured to perform operations comprising:
   verifying the second authentication information by determining that the client signature is the cryptographic function of the AppID, the public cryptographic key, the cryptographic key handle, or any combination thereof.

8. The server of claim 1, wherein, after registering the hardware authentication device, the at least one hardware processor of the server is configured to perform operations comprising:
   receiving, from the client device, a login and a password;
   providing, to the client device, the cryptographic key handle of the registered hardware authentication device from the registration data of the registered hardware authentication device;
   receiving, from the client device, a client signature determined by the registered hardware authentication device based on the private cryptographic key referenced by the cryptographic key handle; and
   in response to verifying the client signature based on the registration data of the registered hardware authentication device, providing a computing resource to the client device.

9. A client system including at least one hardware processor configured to perform operations comprising:
   receiving, from a communicatively coupled server, first authentication information comprising an Application ID (AppID);
   providing the first authentication information to a communicatively coupled hardware authentication device;
   receiving, from the hardware authentication device, second authentication information determined by the hardware authentication device based at least in part on the first authentication information, wherein the second authentication information comprises a public cryptographic key and a cryptographic key handle, wherein the cryptographic key handle references a private cryptographic key corresponding to the public cryptographic key of the hardware authentication device; and providing the second authentication information to the server as registration data for the hardware authentication device, wherein the server is configured to register the hardware authentication device using the registration data.

10. The client system of claim 9, wherein the hardware authentication device is configured to use the first authentication information to generate the private cryptographic key, the public cryptographic key, and the cryptographic key handle.

11. The client system of claim 9, wherein the first authentication information comprises an origin uniform resource identifier (URI), and wherein the hardware authentication device is configured to determine the private cryptographic key and the public cryptographic key based at least in part on the origin URI.

12. The client system of claim 9, wherein the at least one hardware processor is configured to perform operations comprising: providing client data to the hardware authentication device along with the first authentication information.

13. The client system of claim 12, wherein the second authentication information comprises a client signature that is a cryptographic function of the AppID, the public cryptographic key, the cryptographic key handle, the client data, or any combination thereof.

14. The client system of claim 13, wherein, before registering the hardware authentication device, the at least one hardware processor of the server is configured to perform operations comprising:

verifying the second authentication information by determining that the client signature is the cryptographic function of the AppID, the public cryptographic key, the cryptographic key handle, the client data, or the combination thereof.

15. The client system of claim 9, wherein the operations are performed by a browser of the client system.

16. The client system of claim 9, wherein the hardware authentication device is a universal serial bus (USB) hardware authentication device.

17. The client system of claim 9, wherein the hardware authentication device is a near-field communication (NFC) device.

18. The client system of claim 17, wherein the NFC device is part of a cellular telephone.

19. A non-transitory, computer-readable medium storing instructions executable by a processor of a server, the instructions comprising instructions to:

receive, from a client device communicatively coupled to the server, a cryptographic key handle and a first client signature generated by a hardware authentication device associated with the client device;

register the hardware authentication device using at least the cryptographic key handle and the first client signature as registration data for the hardware authentication device; and after registering the hardware authentication device:
  receive, from the client device, a login and a password;
  provide, to the client device, the cryptographic key handle of the registered hardware authentication device from the registration data of the registered hardware authentication device;
  receive, from the client device, a second client signature determined by the registered hardware authentication device based on a private cryptographic key of the registered hardware authentication device referenced by the cryptographic key handle; and
  in response to verifying the second client signature based on the registration data of the registered hardware authentication device, provide a computing resource to the client device.

20. The non-transitory, computer-readable medium of claim 19, wherein the cryptographic key handle is based at least in part on an origin uniform resource identifier (URI).

* * * * *